Figure 1:
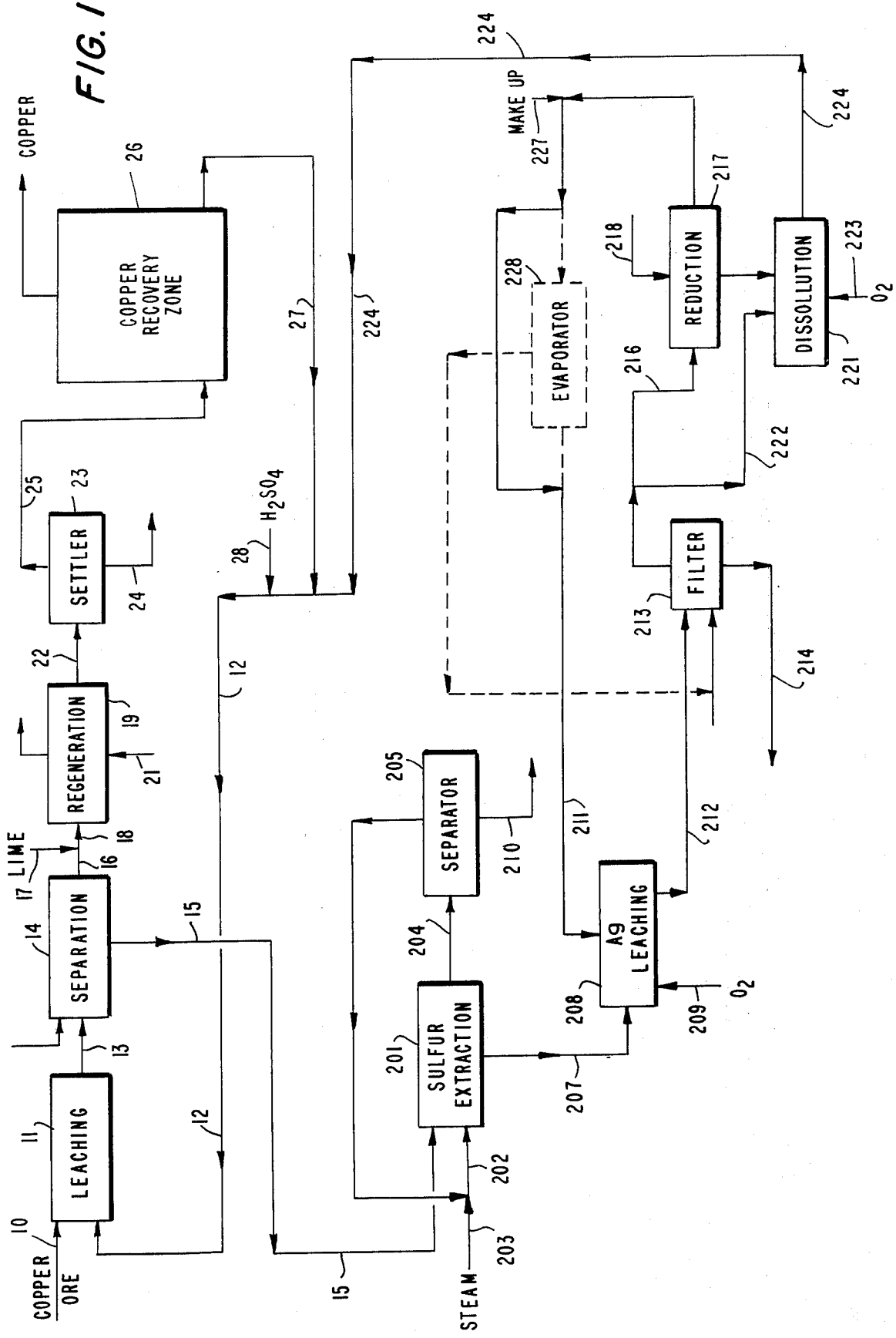

United States Patent [19]

Snell

[11] 3,974,253

[45] Aug. 10, 1976

[54] LEACHING OF COPPER ORES TO RECOVER SULFUR AND SILVER CATALYST

[75] Inventor: George J. Snell, Fords, N.J.

[73] Assignee: The Lummus Company, Bloomfield, N.J.

[22] Filed: Jan. 15, 1975

[21] Appl. No.: 541,274

[52] U.S. Cl. ............................. 423/27; 423/41; 423/578 R; 75/118 R
[51] Int. Cl.² .......................................... C01G 5/00
[58] Field of Search ............. 423/27, 34, 41, 578; 75/101 R, 117, 118

[56] References Cited
UNITED STATES PATENTS

| | | | |
|---|---|---|---|
| 1,937,631 | 12/1933 | Christensen | 423/150 |
| 3,780,167 | 12/1973 | Wheeler | 423/578 |
| 3,816,105 | 6/1974 | McKay | 75/101 R |
| 3,856,913 | 12/1974 | McElroy | 423/27 |
| 3,886,257 | 5/1975 | Snell | 423/27 |

FOREIGN PATENTS OR APPLICATIONS 1,001,486   8/1965   United Kingdom................. 423/578

Primary Examiner—Oscar R. Vertiz
Assistant Examiner—Brian E. Hearn
Attorney, Agent, or Firm—Marn & Jangarathis

[57] ABSTRACT

In the oxidative leaching of copper ores with a silver catalyst initially dissolved in the leaching liquor, all or a portion of the silver precipitates and is recovered with the tailings. Elemental sulfur is extracted from the tailings, and the tailings are treated with concentrated sulfuric acid in the presence of oxygen to recover silver values for recycle to the leaching.

11 Claims, 2 Drawing Figures

LEACHING OF COPPER ORES TO RECOVER SULFUR AND SILVER CATALYST

This invention relates to the recovery of copper, and more particularly to a new and improved process for the oxidative leaching of copper bearing materials.

Copper may be recovered from ores by extraction involving leaching of the copper values under oxidizing conditions. Thus, for example, copper may be leached from ores by use of sulfuric acid to solubilize the copper as copper sulfate. The known processes for such oxidative leaching, however, have numerous disadvantages. Thus, such processes require prolonged leaching periods to produce acceptable copper extractions. In addition, copper recovery from ores such as chalcopyrite is generally low. Accordingly, there is a need for improved processes for oxidatively leaching copper values from ores.

In accordance with the present invention there is provided an improved process for oxidatively leaching a copper ore by use of a leaching solution containing a catalytic amount of silver initially dissolved therein to solubilize copper values. Solid tailings are separated from the leaching solution, and the leaching solution further treated to recover copper therefrom.

It has been found that the silver used as catalyst is present in the solid tailings, and in accordance with the present invention, elemental sulfur is extracted from the solid tailings, followed by leaching of silver from the essentially sulfur free tailings with oxygen and concentrated sulfuric acid. It is to be understood that the term "concentrated sulfuric acid" as used in the Specification and claims also includes oleum (fuming sulfuric acid), which is anhydrous sulfuric acid, containing dissolved sulfur trioxide. Silver is recovered from the sulfuric acid leaching solution, and recycled, as catalyst, to the copper ore oxidative leaching.

It has been found that in order to effectively recover the catalyst silver values from the tailings recovered in the oxidative leaching of a copper ore, the elemental sulfur values must be extracted from such tailings. The elemental sulfur values are preferably extracted from the tailings by the use of either pressurized hot water or an organic sulfur extraction solvent, including aromatic solvent; e.g., benzene, toluene, xylene, BTX (benzene-toluene-xylene), polycyclic aromatics, etc.; carbon disulfide, carbon tetrachloride, etc. The extraction is generally effected at temperatures of from 50° to 400°F. In general, the solid tailings should be treated to produce tailings with no more than 2.0% elemental sulfur, and preferably no more than 0.2% elemental sulfur.

The solid tailings, essentially free of elemental sulfur, are then subjected to the silver leaching step wherein silver is leached from the tailings by the use of concentrated sulfuric acid and oxygen, generally introduced as air. The term concentrated sulfuric acid as used herein means a concentration of at least 50 weight percent. The sulfuric acid concentration is preferably at least 80 weight percent, and as hereinabove noted, the term also encompasses oleum. The leaching of silver is generally effected at a temperature of at least 180°F, generally from 180° to 300°F, and preferably a temperature of from 190° to 230°F. Higher temperatures could be employed, but are not required. Oxygen is generally present during the leaching operation in an amount to provide an oxygen partial pressure of from 3 to 100 psia, and preferably of from 5 to 50 psia. The total pressure during the silver leaching is generally in the order of from 0 to 500 psig, and preferably from 10 to 250 psig. Higher oxygen and total pressures could be employed, but are not economically justified.

The silver catalyst values present in the solid tailings are leached into the concentrated sulfuric acid leach solution, and such silver catalyst values are recovered for recycle to the oxidative leaching of copper ores. The silver values can be recovered from the leaching solution and such recovery can be effected by any one of a wide variety of procedures. Thus, for example, silver values can be recovered from the concentrated sulfuric acid leach liquor by reduction with a metal less noble than silver, such as, for example, copper, iron or zinc. The cement silver may be recycled to the copper leaching operation as such for solubilization in the leach solution or solubilized in a suitable solution, such as, for example, oxygenated sulfuric acid. Alternatively, the silver values can be recycled, in part, in the concentrated sulfuric acid recovery leach solution, provided the additional sulfuric acid does not imbalance the leaching operation.

The copper ores are leached with either aqueous ferric sulfate; or a combination of aqueous sulfuric acid and oxygen; or concentrated sulfuric acid, as the oxidative leaching agent, in the presence of silver dissolved in the leaching medium. The silver is generally added to the leaching solution to initially provide silver in an amount from 25 to 10,000 ppm, and preferably an amount from 50 to 500 ppm of soluble silver, calculated as elemental silver. It is to be understood, however, that greater amounts could be used, but generally such greater amounts are not economically justifiable. The silver is added in a form which is at least initially soluble in the leaching medium; e.g., the silver values are soluble at the initiation of leaching but, during leaching, all or some of the soluble silver may precipitate from the solution. The oxidative leaching medium, as hereinabove described, may be an aqueous medium or may be a sulfuric acid medium (dilute or concentrated), and the silver is added in a form which is at least initially soluble in the leaching medium. The silver may be added to the leaching medium either as metallic silver or as a silver compound, such as, silver nitrate, silver oxide, silver sulfate, silver fluoroborate, and the like. The use of a suitable form of silver to provide an initial catalytic amount of silver dissolved in the leaching medium is deemed to be within the scope of those skilled in the art from the teachings herein. It is to be understood that the term "silver" as hereinafter employed with respect to the catalyst which is at least initially soluble in the leaching solution generically includes the use of both metallic silver and silver compounds as the source of soluble silver.

The copper bearing ores (the term "ore" as used herein includes ore concentrates) may be any one of the wide variety of copper bearing ores including complex mineral sulfides composed of copper, sulfur and iron in varying proportions, such as chalcopyrite (Cu Fe $S_2$) and bornite (Cu Fe $S_4$) and copper sulfide ores such as chalcocite ($Cu_2S$) and covellite (Cu S). The ores or concentrates are prepared, as known in the art, prior to the oxidative leaching. In general, a concentrate of the ore is prepared by flotation and the concentrate pulverized; e.g., to 100% minus 150 mesh. The preparation of the ore, prior to the leaching, forms no part of the present invention, and no further details in this respect are required for a full understanding of the present invention.

The copper bearing one may be oxidatively leached, as hereinabove noted, by using ferric sulfate, either in the presence or absence of sulfuric acid, or in the presence or absence of oxygen, and preferably in the presence of dilute sulfuric acid, and in the presence of a catalytic amount of silver which is at least initially soluble in the leaching medium. As a result of the leaching, copper and iron, if present are extracted into the liquid phase in the form of sulfates and by-product elemental sulfur is deposited in the solid phase. The leaching, using chalcopyrite as a representative ore may be represented by the following equation:

$$Cu\,Fe\,S_2 + 2Fe_2(SO_4)_3 \rightarrow Cu\,SO_4 + 5Fe\,SO_4 + 2S$$

The quantity of ferric sulfate which is provided in the leaching depends on the amount of copper desired in the final leach solution. The ferric sulfate is added in a quantity sufficient to combine with copper values of the ore, present as sulfides, to convert copper values to sulfates in an amount which provides the desired concentration of dissolved copper in the final leach solution. In general, the aqueous leach solution contains from 2 to 40 wt. % ferric sulfate (preferably 10 – 40 wt. %) and sulfuric acid in an amount from 0 to 20 wt. % and preferably from 1.0 to 5.0 wt. %. The leaching solution may also include some cupric sulfate in that complete recovery of copper values from the pregnant solution resulting from the leaching is not possible in all cases. In addition, the leaching solution includes, as hereinabove noted, a catalytic amount of silver which is at least initially soluble in the leaching solution. The ore and leaching solution are generally combined in an amount to provide a pulp density (pounds of ore pre pound of total solution) from 1 to 40%, and preferably from 5% to 25%, in the leaching solution.

The leaching is generally effected at temperatures from 150°F to 235°F, preferably temperatures from 180°F to 225°F, and at pressures from 0 to 3000 psig, and preferably from 0 to 300 psig.

The suspended solids are separated from the leaching effluent, and the copper is recovered from the solid free pregnant leach solution by conventional techniques; e.g., extraction and electrowinning.

In accordance with a preferred embodiment, the leaching solution, subsequent to the leaching step, is oxidized to convert ferrous sulfate to ferric sulfate, whereby the leaching solution may be continuously regenerated.

Similarly, the copper bearing ore may be oxidatively leached, as hereinabove noted, using a dilute aqueous sulfuric acid leach liquor in conjunction with oxygen to extract copper into the liquid phase as copper sulfate. The leaching, using chalcopyrite as a representative ore may be represented by the following equation:

$$Cu\,Fe\,S_2 + H_2SO_4 + 1\tfrac{1}{4}\,O_2 + \tfrac{1}{2}\,H_2O \rightarrow Cu\,SO_4 + Fe(OH)_3 + 2S$$

The quantity of sulfuric acid which is provided in the leaching depends on the amount of copper desired in the final leach solution. The sulfuric acid is added in a quantity sufficient to combine with copper values of the ore, present as sulfides, to convert copper values to sulfates in an amount which provides the desired concentration of dissolved copper in the final leach solution. In general, the aqueous sulfuric acid leach solution contains from 0.5% to 5.0% and preferably from 0.5 to 2.0%, all by weight, of sulfuric acid and a catalytic amount of silver, initially soluble in the leaching solution. The leaching solution may also include some cupric sulfate in that complete recovery of copper values from the pregnant solution produced in the leaching is not possible in all cases. The leaching solution may also include a buffering agent, such as, for example, ammonium sulfate, to aid in the prevention of solubilization of iron values, if any, in the ore.

The leaching operation is generally effected at a temperature from 150°F to 235°F preferably from 180°F to 225°F and at oxygen partial pressures from 100 to 500 psia, preferably from 200 to 500 psia. The ore and leaching solution are generally combined in an amount to provide a pulp density from 5% to 40%, and preferably from 15% to 30%. In addition, if desired, in order to prevent solubilization of iron values at the end of the leaching, the acidity of the leaching solution is controlled (by use of a suitable buffering agent such as ammonium sulfate) in order to selectively leach copper values from the ore. In general, the pH should be from 1.0 to 5.0, and preferably from 1.5 to 3.0.

The copper bearing ore may also be oxidatively leached by the use of concentrated sulfuric acid; the leach solution contains at least 90% sulfuric acid.

The leaching with sulfuric acid, using chalcopyrite as a representative ore, may be represented by the following equation:

$$Cu\,Fe\,S_2 + 4\,H_2SO_4 \rightarrow CuSO_4 + FeSO_4 + 2S° + 2SO_2 + H_2O$$

The leach solution, as hereinabove noted, contains at least 90%, by weight, sulfuric acid, and also includes, as hereinabove described, a catalytic amount of silver which is at least initially soluble in the leach solution.

The leaching is generally effected at temperatures from 150°F to 235°F, preferably from 180°F to 225°F, and at pressures from 0 to 3,000 psig, and preferably from 0 to 300 psig. The ore and leaching solution are generally combined in an amount to provide a pulp density from 50% to 75%, and preferably from 10% to 40%.

Figure 2:
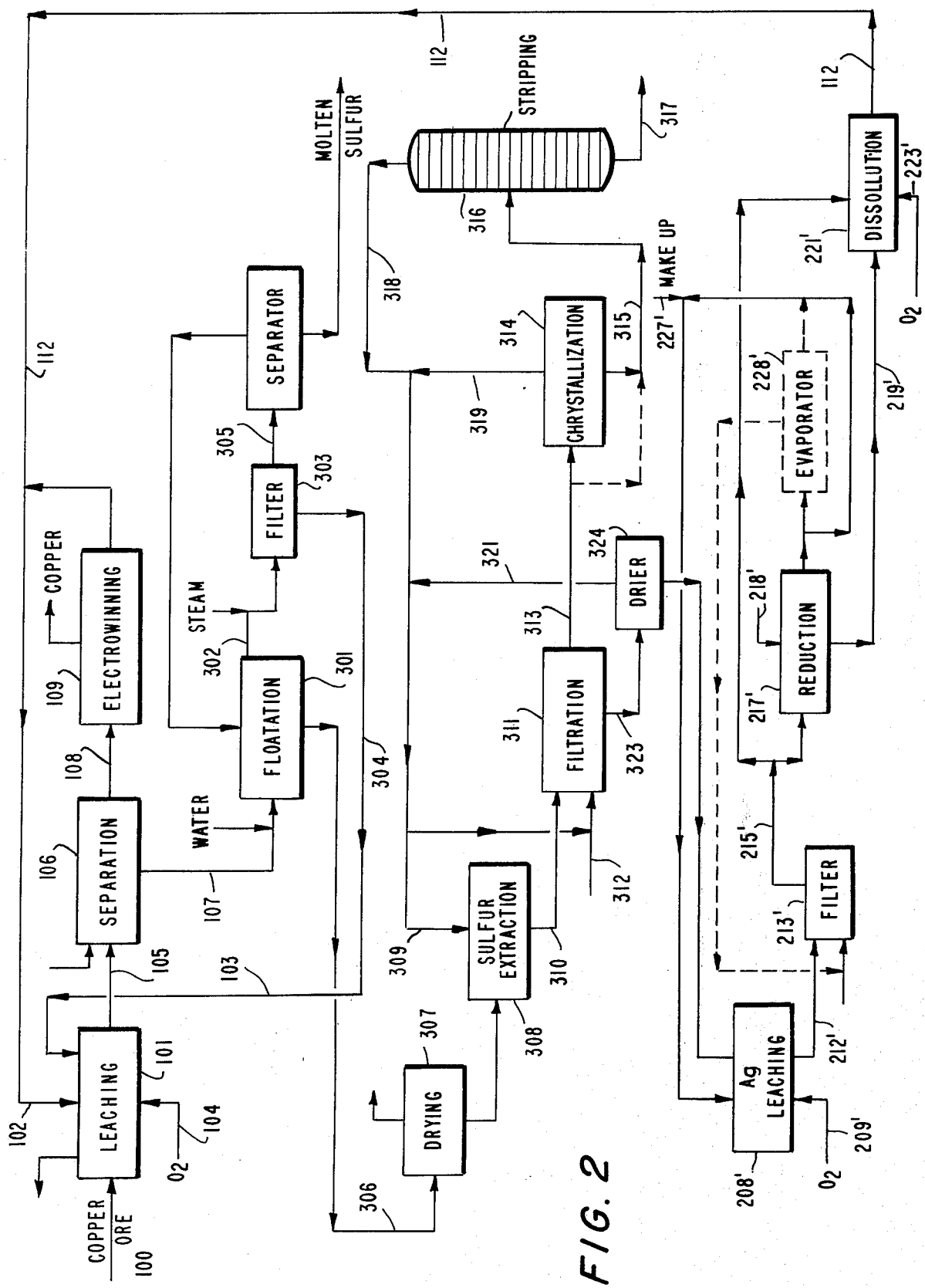

The present invention will be further described with respect to preferred embodiments thereof illustrated in the accompanying drawings wherein:

FIG. 1 is a simplified schematic flow diagram of one embodiment of the present invention; and FIG. 2 is a simplified schematic flow diagram of another embodiment of the present invention.

Referring to FIG. 1 of the drawings, a finely divided (100% - 150 mesh) copper bearing ore concentrate, such as chalcopyrite, in line 10 is introduced into a leaching zone 11 along with a leaching solution in line 12, comprised of an aqueous solution of ferric sulfate, and dilute sulfuric acid and an initial catalytic amount of silver, as hereinabove described, dissolved in the leaching solution. The leaching solution may be free of sulfuric acid, but as hereinabove noted, the presence of sulfuric acid is preferred in that the presence thereof is required for regeneration of ferric sulfate, and in addition, the sulfuric acid retards excessive hydrolysis of ferric sulfate. The leaching may also be effected in the presence of added oxygen to help maintain the iron in its higher valence state. The leaching zone 11, as known in the art, may be comprised of a battery of stirred tanks arrayed for either continuous or batch operation. The leaching zone 11 is operated at the conditions hereinabove described and as a result of the contact between the leaching solution and copper ore, copper and iron values are extracted into the liquid phase as sulfates, and by product elemental sulfur is deposited in the solid phase.

An effluent slurry, comprised of the pregnant leaching solution and solids, is withdrawn from leaching zone 11 through line 13 and introduced into a liquid-solid separation zone, of a type known in the art, designated as 14 to separate suspended solids, as known in the art, which are withdrawn through line 15, and treated to recover silver values therefrom, as hereinafter described.

The solids free pregnant solution is withdrawn from liquid-solid separation zone 14 through line 16 and the pH thereof is adjusted by a suitable base, such as lime, in line 17. The amount of iron which is separated from the pregnant solution, as insoluble iron compounds, during the subsequent oxygenation to regenerate ferric sulfate is pH sensitive, with increasing pH increasing the proportion of iron values separated as insoluble iron compounds. Accordingly, the pH is adjusted prior to the oxidation in order to facilitate separation of iron values in an amount corresponding to that which was leached from the ore.

The pregnant solution in line 18 is introduced into a ferric sulfate regeneration zone, schematically indicated as 19, wherein the ferrous sulfate is oxidized to ferric sulfate with molecular oxygen introduced, generally as air, through line 21. The oxidation reaction may be represented by the following equation:

$$2FeSO_4 + \tfrac{1}{2} O_2 + H_2SO_4 \rightarrow Fe_2(SO_4)_3 + H_2O$$

In addition, the generated ferric sulfate undergoes hydrolysis to insoluble iron compounds (ferric oxide and/or basic ferric sulfate) with the extent of such hydrolysis being pH sensitive as well as time and temperature dependent. The conditions in zone 19 are controlled in such a manner that essentially only that portion of the iron present in the pregnant solution which was derived from the ore is precipitated as insoluble iron compounds.

A liquid slurry comprised of soluble copper values, as copper sulfate, soluble ferric sulfate and insoluble iron compounds and perhaps some insoluble silver (derived from the catalyst) is withdrawn from zone 19 through line 22 and introduced into a settling zone 23 to separate solids therefrom which are withdrawn through line 24.

A solid free leaching solution containing extracted copper values, as cupric sulfate and ferric sulfate, is withdrawn from settling zone 23 through line 25 and introduced into a copper recovery zone, of a type known in the art, schematically indicated as 26, to recover the soluble copper values from the leaching solution. Thus, for example, the copper recovery zone may include an extraction zone wherein the copper values are extracted from the leaching liquid by a suitable extraction solvent, such as hydroxy oxime extractant dissolved in kerosene, followed by stripping of the copper values from the extraction solvent, for example, with sulfuric acid from which the copper metal may be recovered by direct electrolysis, as described in U.S. Pat. No. 3,224,873.

The leaching solution, which may still contain some cupric sulfate, as hereinabove described, is withdrawn from copper recovery zone 26 through line 27, admixed with make-up sulfuric acid in line 28, if sulfuric acid is to be present during the leaching and recycled silver values in line 224, and then passed to the leaching zone through line 12.

The solid tailings in line 15 generally contain greater than 90%, and in the order of 97+% of the silver used for catalyzing the leach operation. The tailings in line 16 are introduced into a sulfur extraction zone, schematically indicated as 201 wherein the tailings are contacted with pressurized water introduced through line 202, which has been heated with live steam in line 203. The sulfur extraction zone 201 is operated at above the sulfur melting temperature and generally at a temperature of from 250°F to 350°F, and a pressure of from 30 to about 135 psia. The sulfur extraction zone 201 is generally a pressure filter wherein the tailings are washed with the pressurized hot water.

An aqueous dispersion of elemental sulfur is withdrawn from zone 201 through line 204 and introduced into a separation 205 wherein molten sulfur is separated from hot water. The hot water is recycled through line 206 and the elemental sulfur is recovered in line 210.

A tailings cake, lean in elemental sulfur, withdrawn from zone 201 through line 210 is introduced into a silver leaching zone 208 along with gaseous oxygen, as air or oxygen alone, in line 209 and concentrated sulfuric acid in line 211 to extract silver from the tailings. A slurry of tailings in concentrated sulfuric acid leach liquor, containing dissolved silver, withdrawn from zone 208 through line 212, is introduced into a liquid-solid separation zone 213, such as a filter, to separate the tailings from the leach liquor. The tailings are washed free of silver and withdrawn from zone 213 through line 214 for routing to a tailings dump or to a precious metal recovery operation.

Leach solution rich in silver, including the wash liquid, is withdrawn from separation zone 213 through line 215 and a portion thereof, in line 216, introduced into a silver reduction zone 217, wherein the dissolved silver is reduced with a less noble metal introduced through line 218.

Cement silver separated from the leach liquor; e.g., by decantation or filtration, is withdrawn from reduction zone 217 through line 219 and introduced into a silver dissolution zone 221 along with the remaining portion of the pregnant silver leach liquor in line 222, and molecular oxygen, in line 223, to effect dissolution of the silver. The dissolved silver is recycled, as catalyst, through line 224 to the oxidative leach zone 11. Alternatively, the cement silver may be recycled from zone 217 without dissolution; however, the silver must be initially dissolved in the leach liquor prior to use thereof.

The sulfuric acid leach liquor, withdrawn from reduction zone 217 through line 226 is provided with make-up sulfuric acid in line 227 and recycled to silver leaching zone 208 through line 211. Alternately, the sulfuric acid leach liquor may be introduced into an evaporator 228, prior to recycle, to increase the sulfuric acid concentration.

A further embodiment of the present invention is illustrated in FIG. 2 of the drawings.

Referring now to FIG. 2 of the drawings, a finely divided (100%-150 mesh) copper bearing ore concentrate, such as chalcopyrite, in line 100 is introduced into a leaching zone 101 along with a leaching solution in line 102, comprised of a dilute aqueous sulfuric acid and a catalytic amount of silver, as hereinabove described. The leach solution may also include a buffer, such as ammonium sulfate, to control pH, and thereby minimize solubilization of iron values, as hereinabove described. Copper sulfide recycle, recovered from the tailings of the leach operation, as hereinafter described, may also be introduced into the leaching zone 101 through line 103. Air or oxygen is also introduced into the leaching zone 101 through line 104. The leaching zone, as known in the art, may be comprised of a battery of stirred vessels, including gas dispersion devices, arranged for a batch or continuous operation. The leaching zone is operated at the conditions hereinabove described, and as a result, copper values are extracted into the leaching solution, as sulfates, and by-product elemental sulfur and iron values are in solid form.

An effluent slurry is withdrawn from leaching zone 101 through line 105 and introduced into a liquid-solid separation zone, of a type known in the art, schematically indicated as 106 to separate solid materials which are withdrawn through line 107.

The pregnant solution of copper sulfate is withdrawn from zone 106 through line 108 and introduced into copper recovery zone 109 wherein copper metal is recovered electrolytically as known in the art. The spent electrolyte, which contain regenerated sulfuric acid in an amount equivalent to the recovered elemental copper is withdrawn from the copper recovery zone 109 and employed as the leach liquor in line 102. Make-up catalyst and/or recovered silver values are added to the leach liquor through line 112.

The solids recovered in separation zone 106 in line 107, are introduced into a copper sulfide removal zone 301, such as a flotation zone, wherein copper sulfide and sulfur are separated from tailings and hydrated ferric oxide. A concentrate rich in sulfur and copper sulfide is withdrawn from zone 301 through line 302 and introduced into a copper sulfide recovery zone 303 wherein the concentrate is heated under pressure and filtered. A copper sulfide rich filter cake is recycled to the leaching zone through line 304 and the filtrate, withdrawn through line 305, is either discarded or washed for sulfur recovery.

The tailings, containing silver catalyst values, withdrawn from separation zone 301 through line 306, are dried in drying zone 307, and introduced into a sulfur extraction zone 308 wherein the tailings are contacted with an organic extraction solvent; in particular BTX, introduced through line 309.

The slurry withdrawn from zone 308, through line 310 is introduced into a solid separation zone 311; in particular a filter, to separate tailings therefrom, which are washed with BTX introduced through line 312.

Filtrate and wash liquid withdrawn from filter 311, through line 313, are introduced into a sulfur crystallizer 314 to crystallize sulfur therefrom.

A slurry of sulfur in BTX, withdrawn from crystallizer 314 through line 315 is introduced into a stripper 316 wherein BTX is stripped from molten sulfur. Molten sulfur is recovered through line 317 and BTX overhead in line 318 is combined with BTX mother liquor from crystallizer 314 in line 319 and BTX, in line 321, obtained as hereinafter described, for use as a wash liquid in line 312 and as extraction solvent in line 309.

Tailings withdrawn from filter 311 through line 323 is dried in BTX drier 324, with separated BTX being withdrawn through line 321. Tailings cake essentially free of elemental sulfur, withdrawn through line 325 are then treated to extract silver therefrom, as hereinabove described with respect to the embodiment of FIG. 1.

It is to be understood that the sulfur extraction procedure disclosed with respect to the embodiment of FIG. 1 could be employed in the embodiment of FIG. 2 and vise versa.

The invention will be further described with respect to the following examples. In the following examples, Examples 1 – 3 are directed to the leaching operation.

Examples 4 – 6 are directed to treating the tailings for recovery of silver catalyst.

Example 6 is in accordance with the invention.

Examples 4 and 5 effect sulfuric acid leaching without prior sulfur removal.

EXAMPLE 1

Six hundred grams of ferric sulfate hydrate (21.3±0.3% Fe) were dissolved in 689 grams of hot water containing 22.4 ml of concentrated sulfuric acid. This leach liquor was transferred to a 1500 ml dimpled, agitated resin flask and heated with stirring to 195±5°F. Silver sulfate was then added to the leach liquor until the silver concentrate was about 360 ppm (0.692 gms $Ag_2SO_4$ added). One hundred thirty gms of copper sulfide ore concentrate III was added and the flask contents were leached for 4 hours at 195 ± 5°F.

The contents of the flask were hot filtered on a 2-liter heated Buchner funnel, and the filter cake was washed with 3-100 ml portions of hot water. About 101 gms of damp tailings cake were recovered from the filter. A chemical analysis of the tailings cake indicated that it contained 18.0 wt. % moisture and about 5400 ppm of silver on a dry basis. In addition, the copper and iron content on an as is basis were found to be 1.08 and 20.6 respectively.

EXAMPLE 2

Six hundred grams of ferric sulfate hydrate (21.3±0.3% Fe) were dissolved in 698 grams of hot water containing 22.0 ml of concentrated sulfuric acid. This solution was transferred to a 1500 ml dimpled, agitated resin flask and heated with stirring to 195±5°F. Silver sulfate was added to the leach liquor until the silver concentration was about 36 ppm (0.070 gms $Ag_2SO_4$ added). One hundred thirty gms of copper sulfide ore concentrate IV was added and the flask's contents were leached for 7.0 hours at 195±5°F. The solid containing pregnant solution was hot filtered on a heated Buchner funnel, and the filter cake was washed with 3-100 ml portions of hot water. About 85 grams of washed damp tailings were recovered from the filter. A chemical analysis of the tailing cake indicated that it contained 14.4% moisture and 500 ppm silver on a dry basis. The tailings contained 23.3 wt% iron and 11.0 wt.% copper.

EXAMPLE 3

Six hundred grams of ferric sulfate hydrate (21.3±0.3% Fe) were dissolved in 689 grams of hot water containing 22.4 ml of concentrated sulfuric acid. This solution was added to the 1500 ml resin flask used in Examples 1 and 2, and heated with stirring to 195±5°F. Silver sulfate was added to the leach liquor until the silver concentration was about 360 ppm (0.692 gms $Ag_2SO_4$ added). One hundred thirty grams of copper sulfide ore concentrate iron was then added and the flask's contents were leached for 4.0 hours at 195±5°F. The solid containing pregnant solution was hot filtered on a 2-liter Buchner funnel and the filter cake was washed with 3-100 ml portions of hot water. About 99 grams of damp tailings cake were recovered from the filter. A chemical analysis performed on the damp tailings cake indicated that it contained about 8.0% moisture and 5400 ppm silver on a dry basis. In addition the copper, ion and elemental sulfur contents of the washed filter cake were found to be 0.61 wt.%, 36.8 wt.%, and 8.2 wt.% respectively.

EXAMPLE 4

Eighty grams of the damp tailings cake prepared in Example 1 were charged to an agitated 1500 ml dimpled resin flask containing 1834 gms of concentrated sulfuric acid at 205°F. This tailings cake contained 18.0 wt. % water and 5400 ppm of silver on a dry basis. The mixture in the resin flask was held at 205±5°F and agitated for 4 hours. Contents of the resin flask were hot filtered on a heated Buchner funnel dressed with fiberglass filter paper, and the resulting filter cake washed with 2-50 ml portions of concentrated sulfuric acid. The spent tailings cake weighed 99 grams and contained 343 ppm of silver on an as is basis, which is equivalent to a 90.1% silver recovery.

EXAMPLE 5

Forty two grams of damp tailings cake prepared in Example 2 were charged to a 1-liter stainless steel autoclave containing 917 gms of concentrated sulfuric acid which had been preheated to 205°F. The autoclave was equipped with a Dispersimax agitator to insure intimate gas/liquid dispersion. An 80 psig oxygen supply was connected to the gas space of the autoclave, and its contents were leached for 4.0 hours at 205±5°F. The autoclave's gas space was maintained at 80 psig via an attached oxygen bottle throughout the run. After 4.0 hours of leaching the contents of the autoclave were quickly cooled to 100°–120°F. and the clave pressure was simultaneously vented to atmospheric pressure. The contents of the autoclave were then hot filtered and the resulting filter cake was washed with 2-100 ml portions of hot water. Forty one grams of spent damp cake were recovered which contained 9.9 wt. % moisture and 90 ppm silver on a dry basis. This residual silver content is equivalent to a 79.7% silver recovery.

EXAMPLE 6

The damp tailings cake generated in Example 3 was extracted for 1.0 hours with 2-100 ml portions of refluxing xylene in a steam jacketed 250 ml extraction flask. Said extraction flask contained a bottom coarse sintered glass disk to support the solid phase, a reflux condenser, and a bottom stopcock to discharge extract solution at the end of an extraction cycle. The xylene damp, extracted tailings cake was then oven dried at 250°F overnight. The dry xylene extracted filter cake was found to contain <0.1 wt. % elemental sulfur via an analytical procedure based on extraction with carbon disulfide. Thus, the xylene extraction technique cited above was quite effective in removing by product elemental sulfur from the tailings cake generated in this example.

Sixty three grams of the dry, elemental sulfur free tailings cake were charged to a 1-liter autoclave containing 917 grams of concentrated sulfuric acid which had been preheated to 205°F. The equipment was identical to that used in Example 5. The liquid contents of the autoclave were placed under an 80 psig oxygen pad and leached at 205±5°F for 2.5 hours. After cooling and venting, the autoclave's liquid contents were hot filtered on a heated Buchner funnel, and the resulting filter cake was washed with 2-100 ml portions of hot water. Sixty three grams of damp spent filter cake were recovered and analyzed for moisture and silver content. The moisture content and silver content of the damp filter cake were found to be 12.0 wt. % and 58 ppm on a dry basis respectively. The silver recovery is 99%.

The present invention is particularly advantageous in that overall leaching of copper is improved by the use of a silver catalyst, and the silver values are effectively recovered for recycle to the leaching, thereby reducing overall costs.

Numerous modifications and variations of the present invention are possible in light of the above teachings and, therefore, within the scope of the appended claims, the invention may be practiced otherwise than as particularly described.

What is claimed is:

1. In a process for the oxidative leaching of a copper ore with a leaching solution in the presence of a catalytic amount of silver initially dissolved in the leaching solution to solubilize copper values from the ore, wherein leaching solution containing dissolved copper values is separated from solid tailings, said solid tailings including silver employed as catalyst and elemental sulfur, the improvement comprising:
    extracting elemental sulfur from the solid tailings to produce extracted solid tailings containing no more than 2% by weight, elemental sulfur;
    leaching silver from said extracted solid tailings by contacting the tailings with molecular oxygen and concentrated sulfuric acid having a concentration of at least 50 weight percent to produce a sulfuric acid solution containing dissolved silver; and
    recycling leached silver, as catalyst, to said oxidative leaching of the copper ore.

2. The process of claim 1 wherein the leaching of silver is effected at a temperature of from 180° to 300°F.

3. The process of claim 1 wherein the leaching of silver is effected at a pressure of from 0 to 500 psig.

4. The process of claim 2 wherein the leaching of silver is effected at an oxygen partial pressure of from 3 to 100 psia.

5. The process of claim 3 wherein the elemental sulfur is extracted from the solid tailings by the use of an aromatic extraction liquid.

6. The process of claim 4 wherein elemental sulfur is extracted from the tailings by the use of pressured hot water.

7. The process of claim 2 wherein the extracted solid tailings contain no more than 0.2 weight percent elemental sulfur.

8. The process of claim 2 wherein a first portion of the sulfuric acid solution containing dissolved silver is treated to cement silver therefrom, said cement silver being dissolved in a second portion of the sulfuric acid solution containing dissolved silver for recycle of leached silver, as catalyst to the oxidative leaching of the copper ore.

9. The process of claim 1 wherein the elemental sulfur is extracted at a temperature of from 50°F to 400°F.

10. The process of claim 1 wherein the concentrated sulfuric acid is employed as oleum.

11. The process of claim 1 wherein the sulfuric acid concentration is at least 80%.

* * * * *

UNITED STATES PATENT OFFICE
CERTIFICATE OF CORRECTION

Patent No. 3,974,253　　　　　　　　Dated August 10, 1976

Inventor(s)　　George J. Snell

It is certified that error appears in the above-identified patent and that said Letters Patent are hereby corrected as shown below:

Column 3, line 36, "pre" should read -- per --.

Column 9, line 3, delete "iron" and insert -- VI --;
　　　　　line 12, "ion" should be -- iron --; and

*Signed and Sealed this*

Fifteenth Day of March 1977

[SEAL]

Attest:

RUTH C. MASON　　　　　　　　　　C. MARSHALL DANN
*Attesting Officer*　　　　　　　*Commissioner of Patents and Trademarks*